United States Patent
Timoshenko et al.

(10) Patent No.: US 11,783,628 B2
(45) Date of Patent: Oct. 10, 2023

(54) METHOD AND COMPUTING DEVICE FOR PERFORMING A CROWDSOURCING TASK

(71) Applicant: ID R&D Inc., New York, NY (US)

(72) Inventors: Denis Maksimovich Timoshenko, Novgorodskaya oblast (RU); Konstantin Konstantinovich Simonchik, Saint Petersburg (RU)

(73) Assignee: ID R&D Inc., New York, NY (US)

( * ) Notice: Subject to any disclaimer, the term of this patent is extended or adjusted under 35 U.S.C. 154(b) by 139 days.

(21) Appl. No.: 17/323,043

(22) Filed: May 18, 2021

(65) Prior Publication Data
US 2022/0374626 A1    Nov. 24, 2022

(51) Int. Cl.
*G06V 40/16*    (2022.01)
*G06T 7/00*    (2017.01)
*G06V 40/40*    (2022.01)

(52) U.S. Cl.
CPC .......... *G06V 40/166* (2022.01); *G06T 7/0002* (2013.01); *G06V 40/45* (2022.01);
(Continued)

(58) Field of Classification Search
CPC .... G06V 40/166; G06V 40/45; G06T 7/0002; G06T 2207/20084; G06T 2207/30168; G06T 2207/30201; G06Q 40/00
See application file for complete search history.

(56) References Cited

U.S. PATENT DOCUMENTS 10,489,637 B2 * 11/2019 Hu .................. G06V 20/30
2012/0308124 A1 * 12/2012 Belhumeur .......... G06V 10/764
382/159
(Continued)

FOREIGN PATENT DOCUMENTS

RU    2744032 C2    3/2021
RU    2744038 C2    3/2021

OTHER PUBLICATIONS

Gregory G. Slabaugh "Computing Euler angles from a rotation matrix" (Retrieved on Aug. 6, 2000, 1999).
(Continued)

*Primary Examiner* — Santiago Garcia
(74) *Attorney, Agent, or Firm* — MILLEN, WHITE, ZELANO & BRANIGAN, P.C.; William Nixon

(57) ABSTRACT

A method for performing a crowdsourcing task is provided. The method executed on a computing device comprises generating a crowdsourcing task to take at least one image of an original face photo; sending the generated crowdsourcing task to a crowdsourcing server to publish it thereon, the crowdsourcing server communicating with at least one user device registered in the crowdsourcing server; receiving at least one confirmation from the crowdsourcing server, each confirmation corresponding to the crowdsourcing task accepted by a particular user with a corresponding one of the registered user devices; providing an original face photo for each user corresponding to one of the received confirmations; sending, through the crowdsourcing server, the original face photo to a particular user device corresponding to the user; and receiving at least one image from the user device, the received images being taken for the original face photo in accordance with the accepted crowdsourcing task.

12 Claims, 2 Drawing Sheets

(52) U.S. Cl.
CPC ............... *G06T 2207/20084* (2013.01); *G06T 2207/30168* (2013.01); *G06T 2207/30201* (2013.01)

(56) References Cited

U.S. PATENT DOCUMENTS

| | | | |
|---|---|---|---|
| 2013/0188840 A1 | 7/2013 | Ma et al. | |
| 2014/0229413 A1* | 8/2014 | Dasgupta | G06N 99/00 706/46 |
| 2014/0328547 A1* | 11/2014 | Whitehill | G06T 11/00 382/248 |
| 2015/0086072 A1 | 3/2015 | Kompalli et al. | |
| 2015/0324633 A1* | 11/2015 | Whitehill | G06T 3/00 382/248 |
| 2018/0165781 A1* | 6/2018 | Rodriguez | G06Q 40/00 |
| 2018/0349685 A1 | 12/2018 | Kolleri | |
| 2020/0175864 A1* | 6/2020 | Solmaz | H04W 64/006 |
| 2021/0049349 A1* | 2/2021 | Farokhi | G06V 40/166 |
| 2021/0142465 A1* | 5/2021 | Donoghue | G06V 10/40 |
| 2021/0150240 A1* | 5/2021 | Yu | G06V 40/169 |
| 2021/0383100 A1* | 12/2021 | Dahlkamp | G06V 40/50 |
| 2022/0067547 A1* | 3/2022 | Kwatra | G06N 5/04 |

OTHER PUBLICATIONS

O.A. Kapshuk, "Methods and means of protection against spoofing in biometric systems of access control and management using technology of face recognition", International conference on System Analysis and Information Technologies SAIT 2011.

I.A. Kalinovskiy, G.M. Lavrentyeva, "Face anti-spoofing for biometric systems", Computer Vision, GraphiCon, Sep. 24-27, 2018, Tomsk, Russia.

G.B. Marshalko, S.I. Kruglova, "Investigating the possibility of bypassing biometric facial recognition systems using the LBP algorithm", Question of cybersecurity, 2019. No. 1(29).

I.N. Efimov A.M. Kosolapov, N.A. Efimov, "Method and system for spoofing detection and apparatus of video image", Digital Signal Processing No. 3 / 2016.

* cited by examiner

METHOD AND COMPUTING DEVICE FOR PERFORMING A CROWDSOURCING TASK

FIELD OF THE INVENTION

The present invention generally relates to computer technologies, and particularly to crowdsourcing. More particularly, the present invention relates to computing devices and corresponding methods for performing a crowdsourcing task related to collecting images of an original face photo, the collected images being used for training a particular machine-learning liveness algorithm (in particular, a neural network) to be used in a face recognition system to detect different presentation attacks based on presenting fake facial biometric artifacts to the face recognition system.

BACKGROUND OF THE INVENTION

Certain authentication systems, such as those found in various logon processes for a network or computer system, may be based at least in part on the use of biometric information to authenticate a user. Biometric information generally includes physiological features of a user seeking access to the system and/or behavioral features of the user. For instance, physiological features include facial features, fingerprints, and/or retina features. Behavioral features include the behavior of the user, such as voice, gait, among other features.

For instance, in authentication systems based on facial recognition, in particular those authentication systems that use logon procedures involving face recognition, an unauthorized user or unscrupulous user (also referred to in the art as an invader) may seek to circumvent these safeguards by using an image (e.g., physical photo or photograph, electronic image, such as a cell phone or smartphone image, an image from a display screen of a communications device, etc.) of the authorized user to spoof the system into permitting access. In other words, the unauthorized user may present an image of the authorized user to an image capture device (e.g. web camera, video camera, etc.) of the authentication system to spoof the authorized user to gain access to the network or computing system. In other examples of spoofing attacks, the invader may use silicon masks, wax figures or any other suitable staff allowing the invader to imitate the authorized user (in particular, the face of the authorized user). Hence, it is important for authentication systems to distinguish between the actual user and the one pretending to be the user.

In the prior art, different facial liveness detectors are used as integrated modules in the authentication systems to distinguish between the actual user and the one pretending to be the user. Such facial liveness detectors generally use machine-learning algorithms or models to make a liveness decision, wherein one of the most important, expensive and time-consuming aspects of building the machine-learning model is generating or collecting a high-quality dataset to be used for training the machine-learning liveness algorithms and evaluating the liveness.

The above-mentioned problem may be solved by using a crowd-collection service for gathering the training dataset. Generally, a crowd-collection service is implemented in the art as a single crowdsourcing server used by users (also referred to in the art as crowdworkers) owning user devices registered therein and allowing the users to complete any particular crowdsourcing task conjointly in a short time period.

Meanwhile, many different known crowdsourcing servers for performing a crowdsourcing task are described in the art, e.g. in US 2015086072 A1 as published on 26 Mar. 2015, RU 2744032 C2 as published on 2 Mar. 2021, and RU 2744038 C2 as published on 2 Mar. 2021. However, the known crowdsourcing servers, including the above crowdsourcing servers, perform all the operations related to a particular crowdsourcing task, in particular from an initial operation devoted to generating a crowdsourcing task to a final operation devoted to processing datasets received from user devices owned by users performing the generated crowdsourcing task.

Thus, the prior art crowdsourcing servers, including the above-mentioned crowdsourcing servers for performing a crowdsourcing task, may be occasionally overloaded by computations and communications, in particular in case when a complicated crowdsourcing task needs to be performed, such as, for example, the collection of images of an original face photo.

Therefore, developing auxiliary computing devices allowing the computation workload of the crowdsourcing server to be least partly offloaded thereto is an important concern in the art, in particular in case when images of an original face photo need to be collected by using the crowdsourcing server.

SUMMARY OF THE INVENTION

It is an object of the present invention to improve the efficiency of performing a crowdsourcing task related to collecting images of an original face photo.

In a first aspect of the present invention, there is provided a method of performing a crowdsourcing task, the method being executed on a computing device, comprising: generating a crowdsourcing task to take at least one image of an original face photo; sending the generated crowdsourcing task to a crowdsourcing server to publish it thereon, the crowdsourcing server communicating with at least one user device registered in the crowdsourcing server; receiving at least one confirmation from the crowdsourcing server, each confirmation corresponding to the crowdsourcing task accepted by a particular user with a corresponding one of the registered user devices; providing an original face photo for each user corresponding to one of the received confirmations; sending, through the crowdsourcing server, the provided original face photo to a particular user device corresponding to the user; and receiving at least one image from the user device, the received images being taken for the sent original face photo in accordance with the accepted crowdsourcing task.

In an embodiment of the present invention, the provided method further comprises the following operations: computing a quality level for each of the received images; comparing the computed quality level to a predefined quality threshold to detect whether the received image is acceptable; and rejecting the unacceptable image.

In one embodiment of the present invention, the quality level in the provided method is computed on the basis of at least one of the following image parameters of the received image: a blur level, an exposure level, an illumination level, a head rotation level, and a gesture level.

In another embodiment of the present invention, the quality level in the provided method is computed by performing at least the following operations: determining at least two of the following image parameters for the received image: a blur level, an exposure level, an illumination level, a head rotation level, and a gesture level; comparing each of the determined image parameters with a corresponding predefined parameter threshold to assign an acceptance score to the image parameter; and computing the quality level as a total acceptance score based on the assigned acceptance scores.

In various embodiments of the present invention, the provided method further comprises the following operation: comparing each of the accepted images with corresponding one of the provided original face photos to detect whether the accepted image is a photo of the original face photo.

In other embodiments of the present invention, comparing step in the provided method comprises performing at least the following operations: processing each accepted image to extract a detectable face image therefrom, the detectable face image being adapted to standardized sizes and having standardized location; feeding the extracted detectable face image to a pre-trained neural network to extract a detectable face image embedding; processing the original face photo corresponding to the processed image to extract an original face image therefrom, the original face image being adapted to standardized sizes and having standardized location; feeding the extracted original face image to a pre-trained neural network to extract an original face image embedding; and comparing the detectable face image embedding corresponding to the accepted image with the original face photo embedding corresponding to the original face photo by using a cosine similarity therebetween to detect whether the accepted image is a photo of the original face photo.

In a second aspect of the present invention, a computing device for performing a crowdsourcing task is provided. The provided computing device comprises: (i) a task module for generating a crowdsourcing task to take at least one image of an original face photo; and (ii) a communication module communicatively connected to the task module to send the generated crowdsourcing task to a crowdsourcing server to publish it thereon, the crowdsourcing server communicating with at least one user device registered in the crowdsourcing server; wherein the communication module is further configured to receive at least one confirmation from the crowdsourcing server, each confirmation corresponding to the crowdsourcing task accepted by a particular user with a corresponding one of the registered user devices; wherein the task module is further configured to provide an original face photo for each user corresponding to one of the received confirmations; herein the communication module is further configured to send, through the crowdsourcing server, the provided original face photo to a particular user device corresponding to the user; wherein the communication module is further configured to receive at least one image from the user device, the received images being taken for the sent original face photo in accordance with the accepted crowdsourcing task.

In an embodiment of the present invention, the task module in the provided computing device is further configured to perform at least the following operations: computing a quality level for each of the received images; comparing the computed quality level to a predefined threshold to detect whether the received image is acceptable; and rejecting the unacceptable image.

In one embodiment of the present invention, the task module in the provided computing device computes the quality level as one of the following image parameters of the received image: a blur level, an exposure level, an illumination level, a head rotation level, and a gesture level.

In another embodiment of the present invention, the task module in the provided computing device computes the quality level by performing at least the following operations: determining at least two of the following image parameters for the received image: a blur level, an exposure level, an illumination level, a head rotation level, and a gesture level; comparing each of the determined image parameters with a corresponding predefined parameter threshold to assign an acceptance score to the image parameter; and computing the quality level as a total acceptance score based on the assigned acceptance scores.

In various embodiments of the present invention, the task module in the provided computing device is further configured to compare each of the accepted images with corresponding one of the provided original face photos to detect whether the accepted image is a photo of the original face photo.

In other embodiments of the present invention, task module in the provided computing device compares the accepted image with the provided original face photo by performing at least the following operations: processing each accepted image to extract a detectable face image therefrom, the detectable face image being adapted to standardized sizes and having standardized location; feeding the extracted detectable face image to a pre-trained neural network to extract a detectable face image embedding; processing the original face photo corresponding to the processed image to extract an original face image therefrom, the original face image being adapted to standardized sizes and having standardized location; feeding the extracted original face image to a pre-trained neural network to extract an original face image embedding; and comparing the detectable face image embedding corresponding to the accepted image with the original face photo embedding corresponding to the original face photo by using a cosine similarity therebetween to detect whether the accepted image is a photo of the original face photo.

The present invention according to any of the above-disclosed aspects allows processor and memory resources to be shared between the crowdsourcing server and the computing device, the resources being required for performing a crowdsourcing task related to collecting images of an original face photo and for processing the collected image, so that it prevents data loss and speeds up the processing of the collected image.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the drawings, wherein:

DETAILED DESCRIPTION OF THE PREFERRED EMBODIMENTS

The present invention will now be described more fully with reference to the accompanying drawings, in which example embodiments of the present invention are illustrated. The subject matter of this disclosure may, however, be embodied in many different forms and should not be construed as being limited to the embodiments set forth herein.

The following example embodiments of the present invention are provided for performing a crowdsourcing task when a plurality of images of an original human face photo needs to be gathered or collected. However, the present invention is not limited to collecting the images of the original face photo in accordance with the crowdsourcing task; in particular, the present invention is also applicable for collecting any other pictures, figures or photos (e.g. electronic images, such as cell phone or smartphone images, document images, and images from a display screen of a communications device, etc.) of the original face photo when performing the crowdsourcing task.

Figure 1:
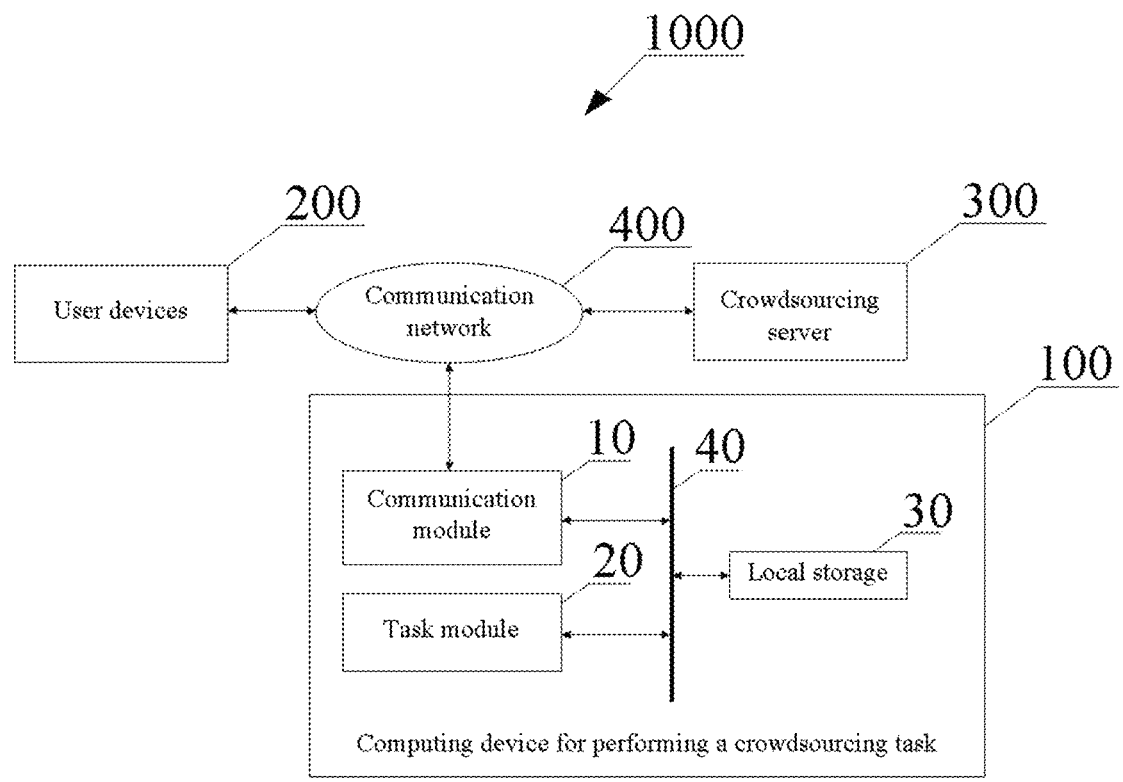
FIG. 1 shows a block diagram of a computing device for performing a crowdsourcing task according to the first aspect of the present invention.

FIG. 1 is a block diagram illustrating a system 1000 for performing a crowdsourcing task related to gathering or collecting the images of the original face photo according to the present invention. The system 1000 comprises a computing device 100, user devices 200, a crowdsourcing server 300 and a communication network 400. The computing device 100 is communicatively connected to the crowdsourcing server 300 via the communication network 400, and the crowdsourcing server 300 is communicatively connected to the user devices 200 via the communication network 400. The computing device 100 is communicatively connected to the user devices 200 via the crowdsourcing server 300. It is to note that user devices 200 may be at least one user device, a plurality of user devices or a particular number of user devices, wherein the user devices 200 are each to be registered in the crowdsourcing server 300.

In an embodiment of the present invention, the computing device 100 may be communicatively connected to the user devices 200 via the communication network 400. In one embodiment of the present invention, the crowdsourcing server 300 may provide communication between the computing device 100 and the user devices 200, in particular data or system requests received from the computing device 100 may be transmitted by the crowdsourcing server 300 via the communication network 400 to corresponding user devices 200, and data or system requests received from the user devices 200 may be transmitted by the crowdsourcing server 300 via the communication network 400 to the computing device 100. In another embodiment of the present invention, the crowdsourcing server 300 may provide a communication channel for communicating data or system requests between the computing device 100 and the user devices 200.

The crowdsourcing server 300 may utilize any crowdsourcing platform known in the art, e.g. the «Amazon Mechanical Turk» crowdsourcing platform, to call on all the crowdworkers or users registered in the crowdsourcing server 300 to perform a particular crowdsourcing task, thereby allowing the crowdsourcing server 300 to receive a required dataset related to the crowdsourcing task accepted or agreed by corresponding users with their user devices. It is to note that each user registered in the crowdsourcing server 300 has a unique identifier (ID) assigned by the crowdsourcing server 300 to the registered user, wherein the assigned user identifier may be a user passport number, IMEI of a user device used for the registration, MAC-address of a user device used for the registration, a phone number and/or similar personal identifier uniquely identifying the user, and the assigned user identifier may be stored in a data storage device comprised in the crowdsourcing server 300. Therefore, the crowdsourcing server 300 is configured to communicate with at least one user device 200 registered in the crowdsourcing server 300.

Generally, the crowdsourcing server 300 may be in the form of a computing or processing device comprised of a combination of a hardware and software or a common computer having a structure known for those skilled in the art. In an embodiment of the present invention, the crowdsourcing server 300 may be implemented as a single computer server, such as «Dell™ PowerEdge™» server running the operating system «Ubuntu Server 18.04». In some embodiments of the present invention, the crowdsourcing server 300 may be in the form of a table computer, laptop, netbook, smartphone, tablet and any other electronic or computing device appropriate for performing functionalities being specific for crowdsourcing platforms. In other embodiments of the present invention, the crowdsourcing server 300 may be implemented in any other suitable hardware, software, and/or firmware, or a combination thereof. A particular implementation of the crowdsourcing server 300 is not limited by the above-mentioned illustrative examples.

The communication network 400 used in the system 1000 may be in the form of Internet, 3G network, 4G network, 5G network, Wi-Fi network or any other wire or wireless network supporting appropriate data communication technologies.

The computing device 100 is intended to perform a crowdsourcing task related to gathering or collecting the images of the original face photo and comprised of two main functional modules: a communication module 10 and a task module 20. The computing device 100 also comprises a data storage 30 and a communication bus 40, wherein the task module 20 is communicatively coupled to the communication module 10 via the communication bus 40, and the communication module 10 and the task module 20 are each communicatively coupled to the data storage 40 via the communication bus 40.

The computing device 100 may be comprised of a combination of a hardware and software or may be a common computer having a structure known for those skilled in the art. In an embodiment of the present invention, the computing device 100 may be implemented as a single computer server, such as «Dell™ PowerEdge™» server running the operating system «Ubuntu Server 18.04». In some embodiments of the present invention, the computing device 100 may be in the form of a table computer, laptop, netbook, smartphone, tablet and any other electronic or computing device appropriate for solving the above-mentioned prior art problems. In other embodiments of the present invention, the computing device 100 may be implemented in any other suitable hardware, software, and/or firmware, or a combination thereof. It is to note that a particular implementation of the computing device 100 is not limited by the above-mentioned illustrative examples.

Functionalities of the communication module 10 and task module 20 will be fully described below with reference to FIG. 1.

The communication module 10 may be communicatively connected via the communication network 400 to the crowdsourcing server 300 and to each of the user devices 200. In one embodiment of the present invention, the communication module 10 may be connected directly to the crowdsourcing server 300 and/or the user devices 200 in wire manner.

The communication module 10 may be implemented as a network adapter provided with slots appropriate for connecting physical cables of desired types thereto if wired connections are provided between the computing device 100 and any external devices mentioned in the present document (in particular, the crowdsourcing server 300 and/or the user devices 200) or as a network adapter in form of WiFi-adaptor, 3G/4G/5G-adaptor, LTE-adaptor or any other appropriate adaptor supporting any known wireless communication technology if wireless connections are provided between the computing 100 and any external devices mentioned in the present document (in particular, the crowdsourcing server 300 and/or the user devices 200). In an embodiment of the present invention, the communication module 10 may be implemented as a network adaptor supporting a combination of the above-mentioned wire or wireless communication technologies depending on types of connections provided between the computing 100 and any external devices mentioned in the present document (in particular, the crowdsourcing server 300 and/or the user devices 200).

The task module 20 is configured to create or generate a crowdsourcing task to take at least one image of an original face photo, wherein the generated crowdsourcing task may be further provided with detailed user guidelines or instructions on how the crowdsourcing task is required to be completed. For example, the user instructions may instruct the user accepting the crowdsourcing task to take a particular number of images of the original face photo, take a particular type of the images (e.g., it needs to be a cell phone image, a smartphone image, an image from a display screen of a communications device, etc.), use a particular way or electronic device for taking the images, etc.

The communication module 10 communicatively connected to the task module 20 is configured to receive the generated crowdsourcing task from the task module 20 and to send or transmit the received crowdsourcing task to the crowdsourcing server 300 communicatively connected to the communication module 10. The crowdsourcing server 300 is configured to publish the crowdsourcing task received from the computing device 100 to make it available or accessible for all the users registered in the crowdsourcing server 300. Thus, any user registered in the crowdsourcing server 300 may accept the published crowdsourcing task with a corresponding user device 200 owned by the registered user and perform the crowdsourcing task in accordance with user instructions provided for the published crowdsourcing task, in particular the accepted crowdsourcing task prescribes that a plurality or at least one image of a particular original face photo are required to be taken by the user performing the crowdsourcing task. When the published crowdsourcing task is accepted by the user wishing to perform the crowdsourcing task, the communication module 10 receives a corresponding confirmation from the crowdsourcing server 300, wherein the confirmation transmitted from the crowdsourcing server 300 to the computing device 100 indicates that the published crowdsourcing task is accepted by a particular user with a corresponding one of the registered user devices 200. Therefore, in view of the above explanations of functionalities of the communication module 10, the communication module 10 is substantially configured to receive at least one confirmation from the crowdsourcing server 300, each confirmation corresponding to the crowdsourcing task accepted by a particular user with a corresponding one of the registered user devices 200.

When the communication module 10 receives the confirmation from the user device 200 used by the user for accepting the published crowdsourcing task, the communication module 10 communicates the received confirmation to the task module 20, and the task module 20 provides an original face photo for the user corresponding to the confirmation. Generally, the communication module 10 may receive a plurality of such confirmations from the crowdsourcing server 300 in a real time and, therefore, may communicate them to the task module 20 simultaneously or sequentially, so that the task module 20 may provide an original face photo for each user corresponding to one of the received confirmations. In one embodiment of the present invention, the original face photo provided by the task module 20 may be a random human face photo preliminary created or generated by the task module 20 based on human face data stored in the data storage 30 accessed by the task module 20 via the communication bus 40. In another embodiment of the present invention, the original face photo provided by the task module 20 may be a predetermined human face photo stored in the data storage 30 accessed by the task module 20 via the communication bus 40. It is to note that the original face photos provided for users corresponding each to one of the received confirmations is substantially the same human face photo.

Then, the communication module 10 transmits or sends, through the crowdsourcing server 300, the provided original face photo to a particular user device corresponding to the user registered by the crowdsourcing server 300 as a user performing the published crowdsourcing task. In other words, the user device 200 receiving the original face photo sent by the communication module 10 actually corresponds to the user corresponding to the received confirmation. Therefore, the communication module 10 is further configured to send, through the crowdsourcing server 300, the provided original face photo to a particular user device 200 corresponding to the user. In an embodiment of the present invention, the communication module 10 may send the original face photo directly to corresponding user device 200 via a communication network 400. In another embodiment of the present invention, the communication module 10 may send the original face photo to corresponding user device 200 by using a communication channel provided by the crowdsourcing server 300 for communicating data between the computing device 100 and a corresponding one of the user devices 200.

The user owning the user device 200 used to receive the original face photo from the communication module 10 takes all the actions prescribed by the crowdsourcing task, in particular the user takes at least one image of the received original face photo corresponding to the accepted crowdsourcing task in accordance with user instructions provided for the crowdsourcing task. Then, the user uses the user device 200 to send the images taken for the original face photo to the computing device 100; the communication module 10 of the computing device 100 receives the taken images from the user device 200. Therefore, in general, the communication module 10 is further configured to receive at least one image from the user device 200 used for performing the crowdsourcing task in the above-described manner, wherein the received images correspond to the crowdsourcing task and are taken for the original face photo by the user owning the user device 200 in accordance with the user instructions provided for the accepted crowdsourcing task. It is to further note that the user owning the user device 200 to be used for performing the crowdsourcing task images may take the images of the received original face photo in any one of the following ways: (i) transmitting the received original face photo to a personal electronic device communicatively connected to the user device 200, displaying the transmitted original face photo on a screen of the electronic device and taking a photo of the screen with the original face photo displayed thereon by using a camera of the user device 200; (ii) printing, by means of a printer communicatively connected to the user device, the received original face photo to have a physical photo or photograph, taking a photo of the printed photograph by using a camera of the user device 200; and (iii) any other suitable ways obvious for those skilled in the art.

The images received by the communication module 10 from the user device 200, the images corresponding to the original face photo, are transmitted via the communication bus 40 directly to the task module 20 to allow the received images to be processed by the task module 20 to determine for each of the received images whether it is suitable or acceptable for incorporating thereof into a training dataset to be further used for training a particular machine-learning liveness algorithm and evaluating the liveness. In one embodiment of the present invention, the images received by the communication module 10 from the user device 200

In another embodiment of the present invention, images received by the communication module 10 from the user device 200, the images corresponding to the original face photo, may be transmitted via the communication bus 40 to the data storage 30 to be stored therein, and the task module 20 may access the data storage 30 via the communication bus 40 to retrieve the previously stored images to further examine them for suitability for the above-mentioned training dataset.

The task module 20 is further configured to perform at least the following operations: (1) computing a quality level for each of the received images corresponding to the original face photo; (2) comparing the computed quality level to a predefined quality threshold to detect whether the received image is acceptable or not; and (3) rejecting the unacceptable image, wherein the examined image is regarded by the task module 20 as unacceptable if the computed quality level of the examined image exceeds the predefined quality threshold.

To perform the above-mentioned operation (1), the task module 20 computes the quality level for each of the received images corresponding to the original face photo on the basis of at least one of the following image parameters: a blur level, an exposure level, an illumination level, a head rotation level, and a gesture level. It is to note that computational methods or algorithms used in the art for calculating or computing each of the blur level, exposure level, illumination level, head rotation level and gesture level are known for those skilled in the art. However, some examples of such computational methods illustrating key aspects thereof are briefly described below for the sake of clarity of operations to be performed by the task module 20 to compute the quality level for the examined image. It is to further note that the quality level for the examined image may be computed based on only one of the above-mentioned image parameters or any appropriate combination thereof.

In one embodiment of the present invention, to compute the blur level as an image parameter indicative of the quality level for each image corresponding to the original face photo the task module 20 may use any appropriate neural network known in the art, in particular the «BlurColorNnet» neural network, for performing an integral analysis method for a set of the following parameters of the examined image: the blur level, the illumination level, and the exposure level.

In such embodiment of the present invention, the above-mentioned «BlurColorNnet» neural network used in the task module 20 for computing the quality level of the examined image may be implemented as a functional submodule of the task module 20 or one of the functionalities of the task module 20, wherein such functional submodule may be in the form of ID R&D proper module of a quality function, which detects inappropriate photo conditions and rejects low quality images. In particular, the submodule detects the following three main inappropriate image conditions: 1) blurred images; 2) unexposed/overexposed images; and 3) high/low contrast images.

In such embodiment of the present invention, to have the above task performed in a precise and effective way the «BlurColorNnet» neural network needs to be pre-trained by using a subset of live image samples without any blurring effect. These image samples are examined as samples for "positive" class, while "negative" class image samples may be generated by using specific augmentation techniques known in the art. For example, to generate blurred images motion, Gaussian and average blur kernels may be used. To generate unexposed or overexposed images the images may be multiplied by low and high constant values. For contrast augmentation, a gamma contrast with low or high gamma parameters is used. It is to note that the «BlurColorNnet» architecture is known in the art and based on the «MobileNetV2» neural network pre-trained with weights from ImageNet classification task. As a result, the submodule based on the «BlurColorNnet» neural network calculates a total coefficient consolidating the blur level, the exposure level and the illumination level of the examined image, wherein the quality level to be computed by the task module 20 is regarded as equal to the calculated cumulative coefficient, and the suitability of the examined image for the above-mentioned training dataset is substantially determined based on the calculated cumulative coefficient. For example, if the calculated cumulative coefficient is over 0.5, the examined image is regarded by the task module 20 as suitable for further processing thereof.

In another embodiment of the present invention, the exposure level for each of the examined images corresponding to the original face photo may be computed by using one of the appropriate computer vision methods known in the art. In particular, the examined image being RGB (255:255:255) image may be converted by the task module 20 into a grayscale (255) image according to a standard conversion formula by using an image intensity: $(0.3*R)+(0.59*G)+(0.11*B)$. Then, the task module 20 may calculate a number of dark pixels, i.e. pixels which have an absolute pixel value being less than 30. Later, the task module 20 may determine the correlation (dD) between the dark pixels of the examined image and the total number of pixels of the examined image. Finally, a value $(1-dD)$ is indicative of image suitability for the further processing, wherein the value exceeding 0.5 corresponds to an appropriate exposure level set for the examined image.

In one embodiment of the present invention, to compute the head rotation level the task module 20 may use a keypoint detector known in the art (also referred to in the art as a face detector) and a function known in the art for estimating Euler angles. It is to note that the above-mentioned keypoint detector and the function may be implemented as a particular functional submodule of the task module 20 or one of the functionalities of the task module 20. An algorithm used by the keypoint detector may use the examined image being the RGB image as an input and may output face coordinates (also referred to in the art as bounding boxes) and keypoint coordinates (also referred to in the art as landmarks) in a reference coordinate system used in the examined image. Meanwhile, the keypoint detector is substantially comprised of a face detector computing the bounding boxes and a landmark detector computing the landmarks.

The face detector may have a classical architecture known in the art, in particular the «SSD-MobileNetV2» architecture. The face detector may compute bounding boxes with [x0, y0, x1, y1] coordinates, likelihood ratios (scores), and class labels for each face on analyzing images, i.e. on each of examined images corresponding to the original face photo. Class labels may be then used to enhance an anti-spoofing engine discrimination: "Face" (label=1) and "No Face" (label=0).

The landmark detector may be based on the «MobileNetV2» neural network used as a backbone, a set of feature extraction layers with full-width horizontal and full-height vertical convolutions and dense layers on top. The following layers of the backbone may be selected in landmark detector as feature map generators:
block_1_expand_relu
block_3_expand_relu
block_6_expand_relu
block_13_expand_relu
Conv_1

Figure 2:
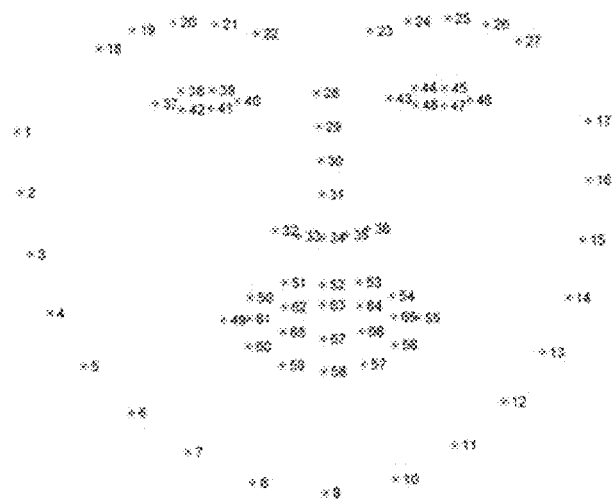
FIG. 2 shows a standard configuration of face landmarks.

The landmark detector computes 68 x-coordinates and 68 y-coordinates of facial keypoints (see FIG. 2) as well as a shift vector applied to the keypoints simultaneously.

The function used in the keypoint detector for estimating Euler angles uses a particular subset taken from a plurality of keypoints computed in the above-described manner, in particular uses the following image points: 31, 9, 37, 46, 49, 55.

The following point coordinates (i.e. model points) are set by the task module 20 for a zero position being a full-face:
X, Y, Z
(0.0f, 0.0f, 0.0f);
(0.0f, −330.0f, −65.0f);
(−165.0f, 170.0f, −135.0f);
(165.0f, 170.0f, −135.0f);
(−150.0f, −150.0f, −125.0f);
(150.0f, −150.0f, −125.0f).

Then, the task module 20 may model a simplified camera having the following parameters: (a) there is no lens distortion; (b) a camera focal length is equal to an image height; and a matrix center of the simplified camera matches a center of the image in a plane. The camera matrix, the image points and the model points are used to provide Perspective-n-Point Camera Pose Estimation by using an iterative method based on the Levenberg-Marquardt optimization, wherein a projection matrix is used as a decision. Furthermore, the task module 20 may decompose the used projection matrix to a rotation matrix (not examined) and required Euler angles to be estimated.

In particular, the above-mentioned operations performed by the task module 20 to compute the head rotation level are described in detail by Gregory G. Slabaugh in the article "Computing Euler angles from a rotation matrix" (Retrieved on Aug. 6, 2000, 1999).

To compute the gesture level for the examined image corresponding to the original face photo the task module 20 analyzes the examined image for the presence of fingers and determines the positions of the revealed fingers. Generally, the task module 20 is configured to detect any user gesture corresponding to a grip applied by the user to a paper sheet or any other means used for performing a presentation attack.

To detect such gesture the task module 20 may use the «SSD-MobileNetV2» neural network, i.e. the same neural network as used by the above-described face detector, wherein the «SSD-MobileNetV2» neural network in this case needs to be pre-trained by using marked arms (palms and hands) to determine coordinates of an arm bounding box presented on the examined image.

If a face bounding box and an arm bounding box are spaced for a min_dist (for example, 200 pix distance) from the face in any one of the dimensions or intersect each other (overlap each other), an arm near the user's face is detected. In other words, the gesture level computed by the task module 20 may substantially correspond to the above-mentioned min_dist value.

In some embodiments of the present invention, the task module 20 may be further configured to compute the quality level by performing at least the following operations: (i) determining at least two of the above-mentioned image quality parameters for the examined image corresponding to the original face photo: the blur level, the exposure level, the illumination level, the head rotation level, and the gesture level; (ii) comparing each of the determined image parameters with a corresponding predefined parameter threshold to assign an acceptance score to the image parameter; and (iii) computing the quality level as a total acceptance score based on the assigned acceptance scores. The total acceptance score may be computed by the task module 20 by using any known appropriate mathematical or statistical method to be applied to the assigned acceptance scores. In particular, the task module 20 may be configured to compute the total acceptance score by calculating an average value of the assigned acceptance scores, i.e. the total acceptance score may be the average value of the assigned acceptance scores. In another example, the total acceptance score computed by the task module 20 may be a linearly weighted score based on the combination of the assigned acceptance scores or any known appropriate nonlinear generalized metric based on the combination of the assigned acceptance scores.

In other embodiments of the present invention, to compute the quality level of the examined image corresponding to the original face photo the task module 20 may be further configured to perform at least the following operations: (a) weighting each of the acceptance scores assigned by the task module 20 to a corresponding image quality parameter of the examined image quality parameters by using a corresponding weight coefficient pre-determined for the image quality parameter and stored in the local data storage 30, the used weight coefficient depending on a value of the image quality parameter; and (b) summarizing or averaging the weighted acceptance scores to calculate the above-mentioned total acceptance score as a resultant weighted acceptance score.

Then, the task module 20 is further configured to compare each of the accepted images (i.e. each image having an acceptable quality level) with corresponding one of the provided original face photos to detect whether the accepted image is a photo of the original face photo.

In particular, to compare the accepted image with the provided original face photo the task module 20 is further configured to perform at least the following main operations: (i) processing each accepted image to extract a detectable face image therefrom, the detectable face image being adapted to standardized sizes and having standardized location; (ii) feeding the extracted detectable face image to a pre-trained neural network to extract a detectable face image embedding; (iii) processing the original face photo corresponding to the processed image to extract an original face image therefrom, the original face image being adapted to standardized sizes and having standardized location; (iv)

feeding the extracted original face image to a pre-trained neural network to extract an original face image embedding; and (v) comparing the detectable face image embedding corresponding to the accepted image with the original face photo embedding corresponding to the original face photo by using a cosine similarity therebetween to detect whether the accepted image is a photo of the original face photo.

The task module 20 may be implemented as a single processor, such as a common processor or a special-purpose processor (e.g., a digital signal processor, an application-specific integrated circuit, or the like).

It is to note that each accepted image detected by task module 20 as a photo of the original face photo may be used for training a particular machine-learning liveness algorithm (in particular, a neural network) and evaluating the liveness, wherein such pre-trained liveness algorithm or neural network may be then used in any face recognition system known in the art to detect different presentation attacks based on presenting fake facial biometric artifacts to the face recognition system.

Figure 3:
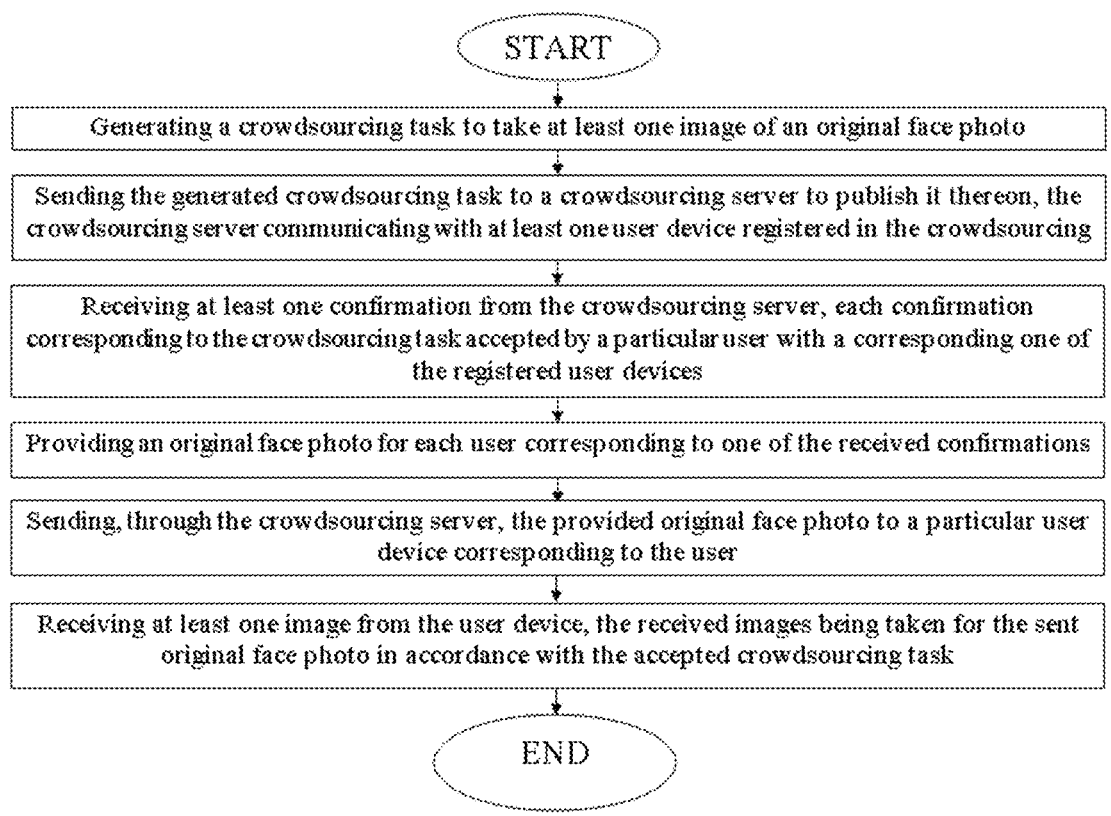
FIG. 3 illustrates a flow diagram of a method of performing a crowdsourcing task according to the second aspect of the present invention.

FIG. 3 illustrates a flow diagram of a method of performing a crowdsourcing task according to a second aspect of the present invention.

The method of FIG. 3 is implemented by the above the computing device 100. Anyway, the method of FIG. 3 may be implemented by any computing or electronic device known in the art, in particular by a processing unit of the above-mentioned common computer.

The method of FIG. 3 comprises the following stages or steps:

(1) generating a crowdsourcing task to take at least one image of an original face photo;
(2) sending the generated crowdsourcing task to a crowdsourcing server to publish it thereon, the crowdsourcing server communicating with at least one user device registered in the crowdsourcing server;
(3) receiving at least one confirmation from the crowdsourcing server, each confirmation corresponding to the crowdsourcing task accepted by a particular user with a corresponding one of the registered user devices;
(4) providing an original face photo for each user corresponding to one of the received confirmations;
(5) sending, through the crowdsourcing server, the provided original face photo to a particular user device corresponding to the user; and
(6) receiving at least one image from the user device, the received images being taken for the sent original face photo in accordance with the accepted crowdsourcing task.

The method of FIG. 3 may further comprise the following stages or steps:

(7) computing a quality level for each of the received images;
(8) comparing the computed quality level to a predefined threshold to detect whether the received image is acceptable; and
(9) rejecting the unacceptable image.

The method of FIG. 3 may further comprise the following stage or step:

(10) comparing each of the accepted images with corresponding one of the provided original face photos to detect whether the accepted image is a photo of the original face photo; and
(11) comparing each of the accepted images with corresponding one of the provided original face photos to detect whether the accepted image is a photo of the original face photo.

It will be apparent to one of skill in the art that described herein is a novel method and a computing device for performing a crowdsourcing task. While the invention has been described with reference to specific preferred embodiments, it is not limited to these embodiments. The invention may be modified or varied in many ways and such modifications and variations, as would be obvious to one of skill in the art, are within the scope and spirit of the invention and are included within the scope of the following claims.

We claim:

1. A method of performing a crowdsourcing task, the method being executed on a computing device, comprising:
   generating a crowdsourcing task to take at least one image of an original face photo;
   sending the generated crowdsourcing task to a crowdsourcing server to publish it thereon, the crowdsourcing server communicating with at least one user device registered in the crowdsourcing server;
   receiving at least one confirmation from the crowdsourcing server, each confirmation corresponding to the crowdsourcing task accepted by a particular user with a corresponding one of the registered user devices;
   providing an original face photo for each user corresponding to one of the received confirmations;
   sending, through the crowdsourcing server, the provided original face photo to a particular user device corresponding to the user having the received confirmation; and
   receiving one or more images from the user device, the received images being taken for the sent original face photo in accordance with the accepted crowdsourcing task.

2. The method of claim 1, further comprising
   computing a quality level for each of the received images;
   comparing the computed quality level to a predefined threshold to detect whether the received image is acceptable; and
   rejecting the unacceptable image.

3. The method of claim 2, wherein the quality level is computed as one of the following image parameters of the received image: a blur level, an exposure level, an illumination level, a head rotation level, and a gesture level.

4. The method of claim 2, wherein the quality level is computed by performing at least the following operations:
   determining at least two of the following image parameters for the received image: a blur level, an exposure level, an illumination level, a head rotation level, and a gesture level;
   comparing each of the determined image parameters with a corresponding predefined parameter threshold to assign an acceptance score to the image parameter; and
   computing the quality level as a total acceptance score based on the assigned acceptance scores.

5. The method of claim 1, further comprising comparing each of the accepted images with corresponding one of the provided original face photos to detect whether the accepted image is a photo of the original face photo.

6. The method of claim 5, wherein comparing step comprises performing at least the following operations:
   processing each accepted image to extract a detectable face image therefrom, the detectable face image being adapted to standardized sizes and having standardized location;
   feeding the extracted detectable face image to a pre-trained neural network to extract a detectable face image embedding;

processing the original face photo corresponding to the processed image to extract an original face image therefrom, the original face image being adapted to standardized sizes and having standardized location;

feeding the extracted original face image to a pre-trained neural network to extract an original face image embedding; and comparing the detectable face image embedding corresponding to the accepted image with the original face photo embedding corresponding to the original face photo by using a cosine similarity therebetween to detect whether the accepted image is a photo of the original face photo.

7. A computing device for performing a crowdsourcing task, the computing device comprising:

a task module for generating a crowdsourcing task to take at least one image of an original face photo; and a communication module communicatively connected to the task module to send the generated crowdsourcing task to a crowdsourcing server to publish it thereon, the crowdsourcing server communicating with at least one user device registered in the crowdsourcing server;

wherein the communication module is further configured to receive at least one confirmation from the crowdsourcing server, each confirmation corresponding to the crowdsourcing task accepted by a particular user with a corresponding one of the registered user devices;

wherein the task module is further configured to provide an original face photo for each user corresponding to one of the received confirmations;

wherein the communication module is further configured to send, through the crowdsourcing server, the provided original face photo to a particular user device corresponding to the user having the received confirmation; and wherein the communication module is further configured to receive one or more images from the user device, the received images being taken for the sent original face photo in accordance with the accepted crowdsourcing task.

8. The computing device of claim 7, wherein the task module is further configured to perform at least the following operations:

computing a quality level for each of the received images;

comparing the computed quality level to a predefined quality threshold to detect whether the received image is acceptable; and rejecting the unacceptable image.

9. The computing device of claim 8, wherein the task module computes the quality level on the basis of at least one of the following image parameters of the received image: a blur level, an exposure level, an illumination level, a head rotation level, and a gesture level.

10. The computing device of claim 8, wherein the task module computes the quality level by performing at least the following operations:

determining at least two of the following image parameters for the received image: a blur level, an exposure level, an illumination level, a head rotation level, and a gesture level;

comparing each of the determined image parameters with a corresponding predefined parameter threshold to assign an acceptance score to the image parameter; and computing the quality level as a total acceptance score based on the assigned acceptance scores.

11. The computing device of claim 7, the task module is further configured to compare each of the accepted images with corresponding one of the provided original face photos to detect whether the accepted image is a photo of the original face photo.

12. The computing device of claim 11, wherein the task module compares the accepted image with the provided original face photo by performing at least the following operations:

processing each accepted image to extract a detectable face image therefrom, the detectable face image being adapted to standardized sizes and having standardized location;

feeding the extracted detectable face image to a pre-trained neural network to extract a detectable face image embedding;

processing the original face photo corresponding to the processed image to extract an original face image therefrom, the original face image being adapted to standardized sizes and having standardized location;

feeding the extracted original face image to a pre-trained neural network to extract an original face image embedding; and comparing the detectable face image embedding corresponding to the accepted image with the original face photo embedding corresponding to the original face photo by using a cosine similarity therebetween to detect whether the accepted image is a photo of the original face photo.

* * * * *